(12) United States Patent
Kishi et al.

(10) Patent No.: US 11,499,840 B2
(45) Date of Patent: Nov. 15, 2022

(54) ACCELERATOR POSITION SENSOR

(71) Applicant: TOYO DENSO KABUSHIKI KAISHA, Tokyo (JP)

(72) Inventors: Shoji Kishi, Saitama (JP); Toshiya Yoshida, Saitama (JP); Takayuki Otani, Saitama (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/338,796

(22) Filed: Jun. 4, 2021

(65) Prior Publication Data

US 2022/0018683 A1 Jan. 20, 2022

(30) Foreign Application Priority Data

Jul. 16, 2020 (JP) .............................. JP2020-122235

(51) Int. Cl.
*G01D 5/14* (2006.01)
*B62J 45/413* (2020.01)

(52) U.S. Cl.
CPC .............. *G01D 5/14* (2013.01); *B62J 45/413* (2020.02)

(58) Field of Classification Search
CPC .......... G01D 5/14; G01D 5/142; G01D 5/145; B62J 45/413
See application file for complete search history.

(56) References Cited

U.S. PATENT DOCUMENTS

| 8,336,423 | B2 * | 12/2012 | Suzuki | .................... F02D 11/02 |
| | | | | 74/504 |
| 8,567,282 | B2 * | 10/2013 | Yaguchi | ................. B62K 23/04 |
| | | | | 74/504 |
| 9,448,054 | B2 * | 9/2016 | Nomura | .................... G01B 7/30 |
| 2005/0251301 | A1 * | 11/2005 | Suzuki | .................... B62K 23/04 |
| | | | | 701/23 |
| 2014/0139079 | A1 | 5/2014 | Kato et al. | |

FOREIGN PATENT DOCUMENTS

EP 2 644 870 A1 10/2013
JP 2020-007995 A 1/2020

OTHER PUBLICATIONS

Extended European Search Report mailed by European Patent Office dated Nov. 18, 2021 in corresponding European patent application No. 21183341.3-1009.

* cited by examiner

*Primary Examiner* — Walter L Lindsay, Jr.
*Assistant Examiner* — Milton Gonzalez
(74) *Attorney, Agent, or Firm* — IP Business Solutions, LLC (57) ABSTRACT

An accelerator position sensor according to the present invention is held inside a throttle grip of a vehicle rotationally operated by a driver. The accelerator position sensor includes: a magnet extended along a rotation axis of the throttle grip and configured to rotate in conjunction with the throttle grip; a magnetic detection unit arranged so as to face a predetermined face of the magnet; and a magnetic body arranged so as to face another face that is different from the predetermined face of the magnet. On the predetermined face and the other face of the magnet, respectively, mutually different numbers of magnetic poles are magnetized along a rotation direction of the magnet.

12 Claims, 7 Drawing Sheets

ACCELERATOR POSITION SENSOR

INCORPORATION BY REFERENCE

This application is based upon and claims the benefit of priority from Japanese patent application No. 2020-122235, filed on Jul. 16, 2020, the disclosure of which is incorporated herein in its entirety by reference.

TECHNICAL FIELD

The present invention relates to an accelerator position sensor installed in a throttle grip of a vehicle.

BACKGROUND ART

On a motorcycle, a driver rotates a throttle grip and thereby adjusts an accelerator opening to operate an accelerator. Detection of an accelerator opening is performed by detection of the rotation angle of a throttle grip. Meanwhile, in recent years, detection of an accelerator opening is often performed by detection of a magnetic flux generated by a magnet rotating together with a throttle grip by a magnetic sensor.

Patent Document 1 discloses an example of an accelerator position sensor that detects an accelerator opening with a magnetic sensor. To be specific, the accelerator position sensor disclosed by Patent Document 1 is held and installed inside a handle bar, and includes a magnet extending along the central axis of the handle bar, a tubular member made of magnetic material that houses the magnet, and a magnetic sensor arranged so as to face the end of the magnet. The magnet is provided with a plurality of magnetic poles magnetized along a rotation direction around the central axis, and is installed so as to rotate in conjunction with the throttle grip. With this, the accelerator position sensor disclosed by Patent Document 1 detects a rotation angle by the magnetic sensor on the side of end of the magnet, and generates an operating load on the driver by a resistance force generated in the tubular member made of magnetic material on the side of the side face of the magnet.

Patent Document 1: Japanese Unexamined Patent Application Publication No. JP-A 2020-007995

However, in the abovementioned magnet, the magnetized states of the magnetic poles at the end and on the side face of the magnet are the same, so that the fully open angle of the throttle grip and the operating load on the driver cannot be changed individually. For example, the operating load is decreased when the fully open angle of the throttle grip is increased, whereas the fully open angle of the throttle grip is decreased when the operating load is increased. As a result, there arises a problem that the degree of freedom in design with respect to a detection angle and an operating load in an accelerator position sensor is low.

SUMMARY OF THE INVENTION

Accordingly, an object of the present invention is to solve the abovementioned problem that the degree of freedom in design with respect to a detection angle and an operating load in an accelerator position sensor is low.

An accelerator position sensor according to an aspect of the present invention is held inside a throttle grip of a vehicle rotationally operated by a driver. The accelerator position sensor includes: a magnet extended along a rotation axis of the throttle grip and configured to rotate in conjunction with the throttle grip; a magnetic detection unit arranged so as to face a predetermined face of the magnet; and a magnetic body arranged so as to face another face that is different from the predetermined face of the magnet. On the predetermined face and the other face of the magnet, respectively, mutually different numbers of magnetic poles are magnetized along a rotation direction of the magnet.

Further, a magnet according to an aspect of the present invention is installed in an accelerator position sensor held and installed inside a throttle grip of a vehicle. The accelerator position sensor includes: the magnet extended along a rotation axis of the throttle grip and configured to rotate in conjunction with the throttle grip; a magnetic detection unit arranged so as to face a predetermined face of the magnet; and a magnetic body arranged so as to face another face that is different from the predetermined face of the magnet. On the predetermined face and the other face of the magnet, respectively, mutually different numbers of magnetic poles are magnetized along a rotation direction of the magnet.

With the configurations as described above, the present invention enables increase of the degree of freedom in design with respect to a detection angle and an operating load in an accelerator position sensor installed in a throttle grip.

EXAMPLE EMBODIMENT

First Example Embodiment

Figure 1:
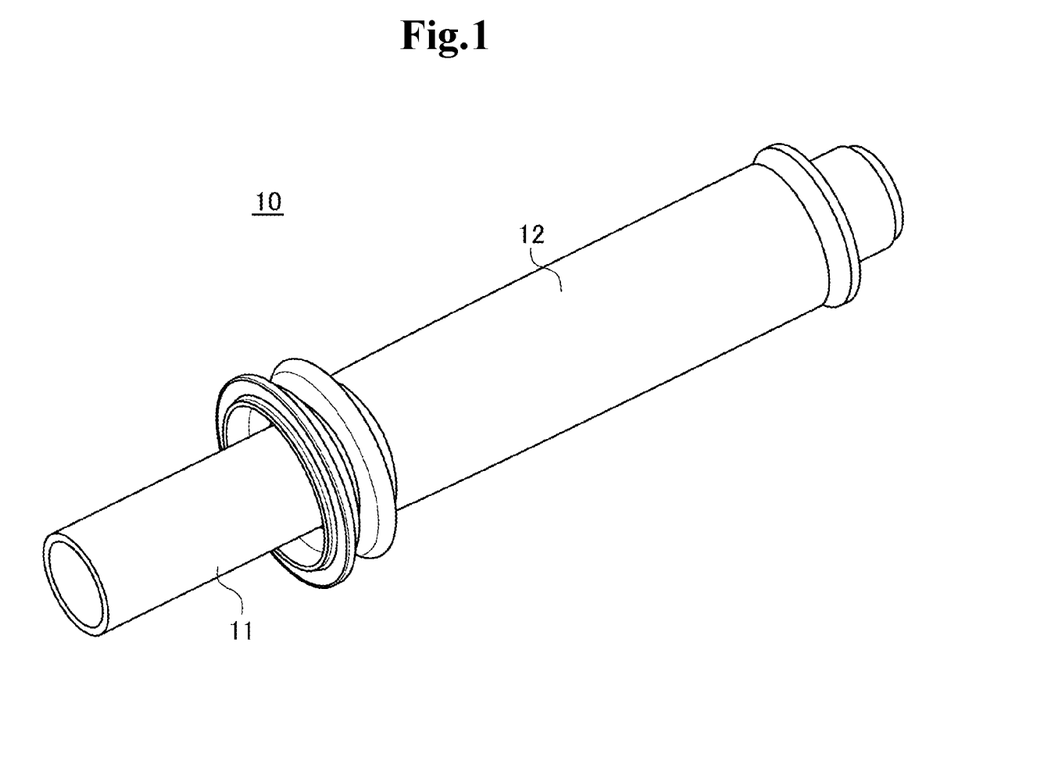
FIG. 1 is a view showing the overview of the configuration of a throttle device equipped with an accelerator position sensor in a first example embodiment of the present invention.

A first example embodiment of the present invention will be described with reference to FIGS. 1 to 7. FIG. 1 is a view for describing the configuration of a throttle device, and FIGS. 2 to 7 are views for describing the configuration of an accelerator position sensor.

[Configuration]

An accelerator position sensor 14 in this example embodiment is a device for detecting the degree of rotation of a rotating body, that is, the rotation position (the position) in the rotation direction of the rotating body. Specifically, the accelerator position sensor 14 in this example embodiment is mounted on a throttle device 10 for operating an accelerator of a motorcycle as shown in FIG. 1, and is for detecting the rotation angle of a throttle grip 12. Moreover, the accelerator position sensor 14 in this example embodiment is for generating a feeling of operation due to a resistance force against a rotation operation of the throttle grip 12 by a driver. However, the accelerator position sensor 14 in the present invention is not limited to be necessarily mounted on the throttle device 10 of a motorcycle, and may be mounted on a throttle device installed in any vehicle.

FIG. 1 shows the overview of the configuration of the throttle device 10 in this example embodiment. The throttle device 10 includes the throttle grip 12 having a substantially cylindrical shape attached to a handlebar 11 having a substantially cylindrical shape of a motorcycle. The throttle grip 12 composes a rotating body that is rotatable in a specific rotation direction about the central axis along the longitudinal direction of the substantially cylindrical shape with respect to the handlebar 11. For example, the throttle grip 12 is in a state of being stopped at a preset initial position when not rotated by an operator who is the driver, and the throttle grip 12 is rotated to a rotation position according to a rotation operation status when gripped and rotated in a specific rotation direction by the operator.

Figure 2:
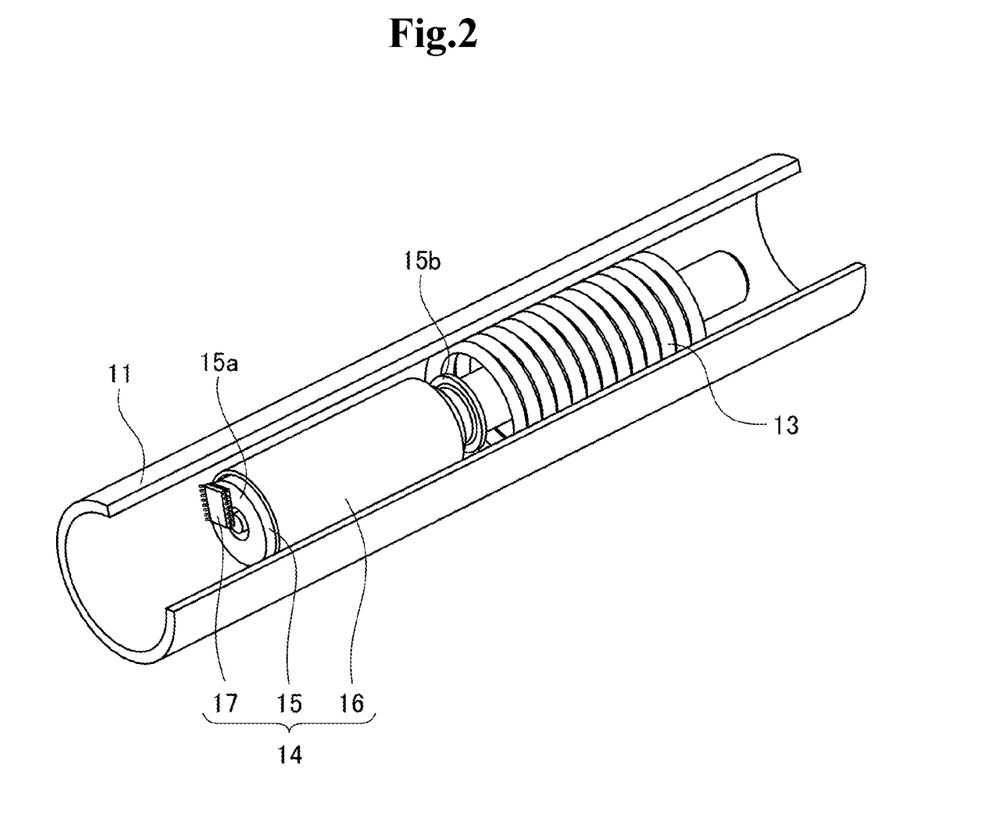
FIG. 2 is a view showing the configuration of the accelerator position sensor disclosed in FIG. 1.

FIG. 2 shows the inside of the throttle grip 12, more specifically, the configuration of the inside of the handle bar 11 located inside the throttle grip 12. As shown in this view, the throttle device 10 is, inside the handle bar 11, equipped with an accelerator position sensor 14 that detects the rotation position of the throttle grip 12 and a return spring 13 that applies a rotation force to return the throttle grip 12 to an initial position after the rotation operation by the operator ends.

As shown in FIG. 2, the accelerator position sensor 14 includes an inner rotor 15 made of a magnet having a substantially cylindrical shape that extends along the rotation axis of the handlebar 11, that is, the throttle grip 12, an outer case 16 made of a magnetic material having a substantially cylindrical shape that holds the inner rotor 15 inside thereof, and a magnetic sensor 17 arranged so as to face one end face of the inner rotor 15. Since the inner rotor 15 is attached coaxially with the rotation axis of the throttle grip 12, the inner rotor 15 is rotated at the same rotation angle as the rotation angle of the throttle grip 12 in conjunction with rotation around the rotation axis of the throttle grip 12. On the other hand, the outer case 16 and the magnetic sensor 17 are fixedly mounted on the handlebar 11 and arranged so as not to rotate in conjunction with the throttle grip 12.

Figure 3A:
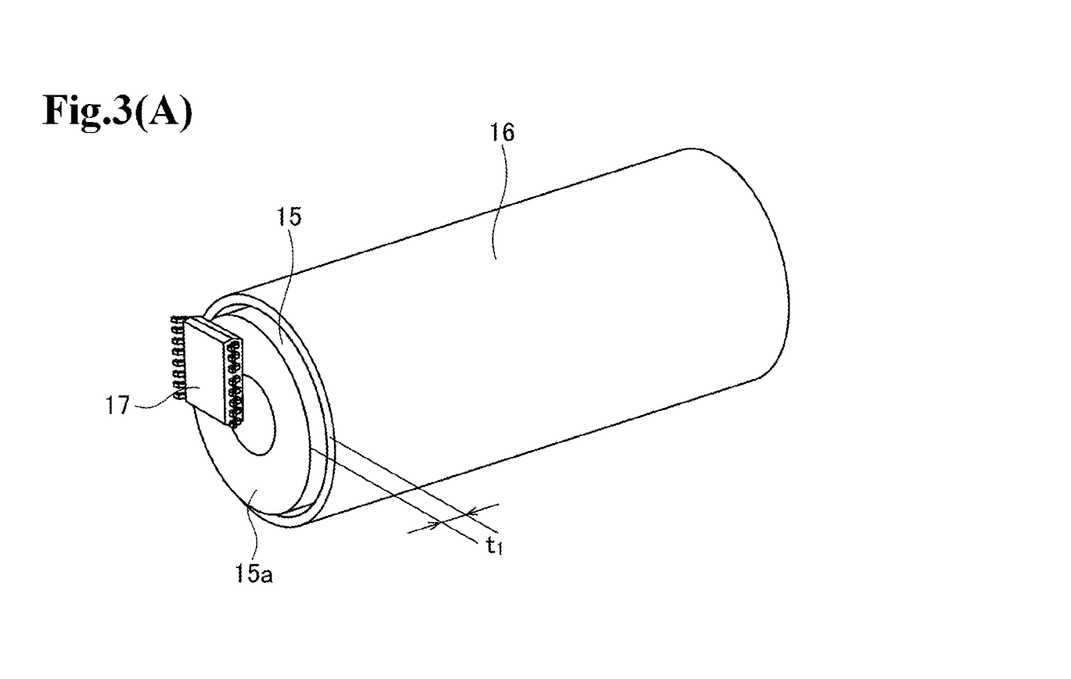
FIG. 3(A) is a view showing the configuration of the accelerator position sensor disclosed in FIG. 1.
Figure 3B:
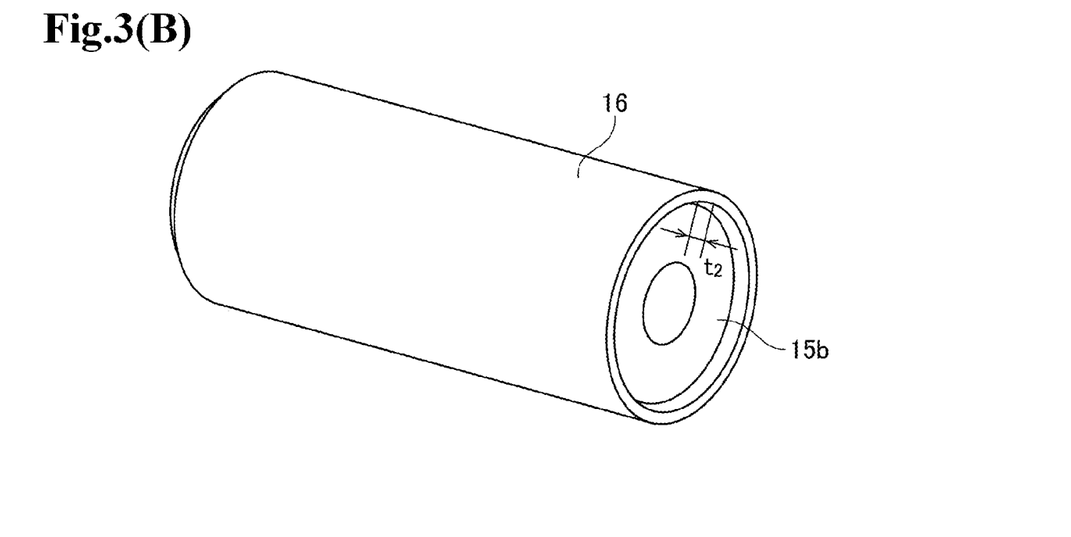
FIG. 3(B) is a view showing the configuration of the accelerator position sensor disclosed in FIG. 1.
Figure 4:
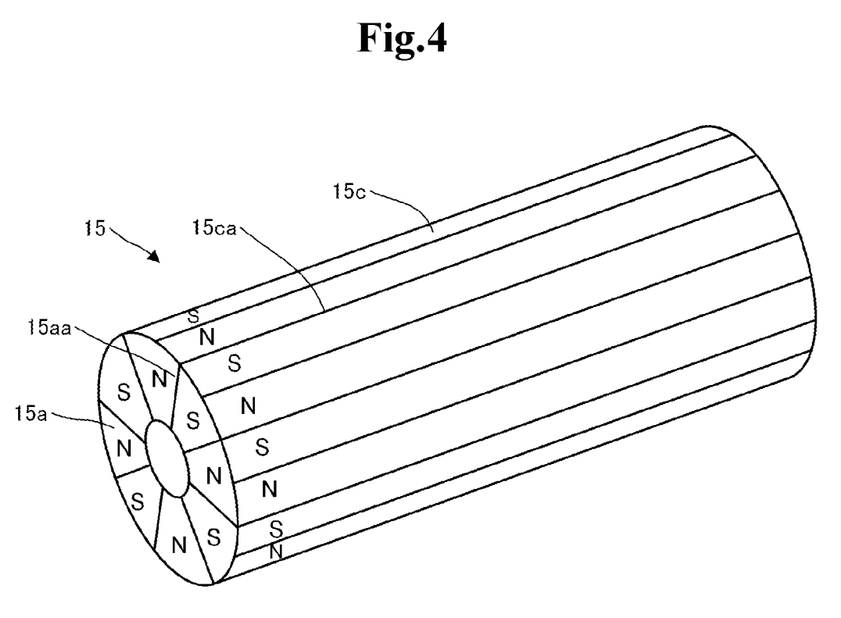
FIG. 4 is a view showing the configuration of a magnet composing the accelerator position sensor disclosed in FIG. 1.

As described above, the inner rotor 15 is formed in a substantially cylindrical shape having a predetermined length and, as shown in FIGS. 2 to 4, has circular end faces (one end face 15a and other end face 15b) formed along planes substantially orthogonal to the rotation axis on both the ends in the rotational axis direction, respectively. In the center of both the end faces of the inner rotor 15, a through hole passing through between both the end faces is formed. On the one end face 15a located on the opposite side from the end of the throttle grip 12 of the inner rotor 15, a plurality of magnetic poles are magnetized along the rotation direction. Also, on a side face 15c formed along the rotation direction about the rotation axis of the inner rotor 15, a plurality of magnetic poles are magnetized along the rotation direction along the rotation direction. The magnetization status of the magnetic poles on the inner rotor 15 will be described later.

As shown in FIGS. 2 and 3, the magnetic sensor 17 (a magnetic detection unit) is arranged so as to face the one end face 15a of the inner rotor 15 on which the magnetic poles are formed. Then, the magnetic sensor 17 is configured to detect a detection value according to the direction of a magnetic flux along the rotation direction. Therefore, by detecting the rotation angle of the inner rotor 15 based on the detection value of the magnetic sensor 17, the rotation angle, that is, the throttle opening of the throttle grip 12 rotating in conjunction with the inner rotor 15 can be detected. Although the magnetic sensor 17 is composed of, for example, a Hall element, a magnetic resistance effect element, a magnetic impedance element, or a superconducting quantum interference element, such elements are examples and the magnetic sensor 17 may be composed of any element. A range of detection of the rotation angle of the inner rotor 16 by the magnetic sensor 17 will be described later.

The outer case 16 has a substantially circular shape having a predetermined length in a direction along the rotation axis as described above, and is made of, for example, a soft magnetic material or a semi-hard magnetic material. The outer case 16 holds the inner rotor 15 inside thereof, and is arranged coaxially with the inner rotor 15. The outer case 16 is formed so as to have a slightly larger diameter than the inner rotor 15, and therefore, has a slight gap with the outer face of the inner rotor 15. That is to say, the outer case 16 is arranged in a state of surrounding a side face formed along the rotation direction about the rotation axis of the inner rotor 15. The outer case 16 is formed so as to have a substantially equal total length to the total length of the inner rotor 15, and most of the inner rotor 15 is held in the outer case 16. At this time, as shown in FIG. 3(A), the one end face 15a the inner rotor 15 that faces the magnetic sensor 17 is located so as to protrude by a length t1 from the corresponding end of the outer case 16. On the contrary, as shown in FIG. 3(B), the other end face 15b of the inner rotor 15 that is on the side of the throttle grip 12 is located to be inward by a length t2 from the corresponding end of the outer face 16. However, the inner rotor 15 and the outer case 16 are not limited to be arranged in the positional relation shown in FIG. 3, and may be arranged in any positional relation that at least part of the side face 15c of the inner rotor 15 is surrounded by the outer case 16.

The outer case 16 is fixedly mounted on the handle bar 11. Therefore, when the inner rotor 15 rotates in conjunction with rotation of the throttle grip 12, the outer case 16 is magnetized to a magnetic pole opposite that of the magnetic poles formed on the side face 15c of the inner rotor 15 that the outer case 16 faces. As a result, the magnetized outer case 16 generates a magnetic force so as to prevent rotation of the inner rotor 15, so that the magnetic force is transmitted as a resistant force to the throttle grip 12 via the inner rotor 15, and gives a feeling of operation to an operator who operates the throttle grip 12. The relation between the outer case 16 and the magnetic poles of the inner rotor 15 will be further described later.

Next, the configuration of the inner rotor 15 described above will be further described with reference to FIGS. 4 to 7. As shown in FIG. 4, the inner rotor 15 has a plurality of magnetic poles magnetized and formed on the one end face 15a facing the magnetic sensor 17 and on the side face 15c surrounded by the outer case 16, respectively. Specifically, on the inner rotor 15 in this example embodiment, the numbers of the magnetic poles magnetized and formed on the one end face 15a and the side face 15c are different from each other.

Figure 7A:
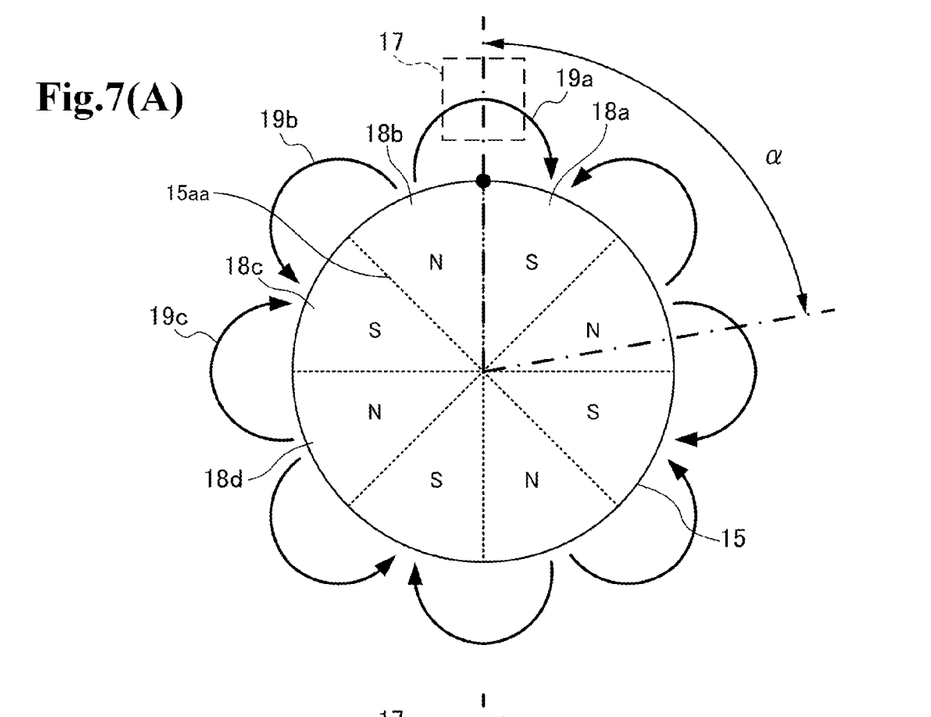
FIG. 7(A) is a view showing an example of the arrangement of the magnet and the magnetic sensor composing the accelerator position sensor disclosed in FIG. 1.
Figure 7B:
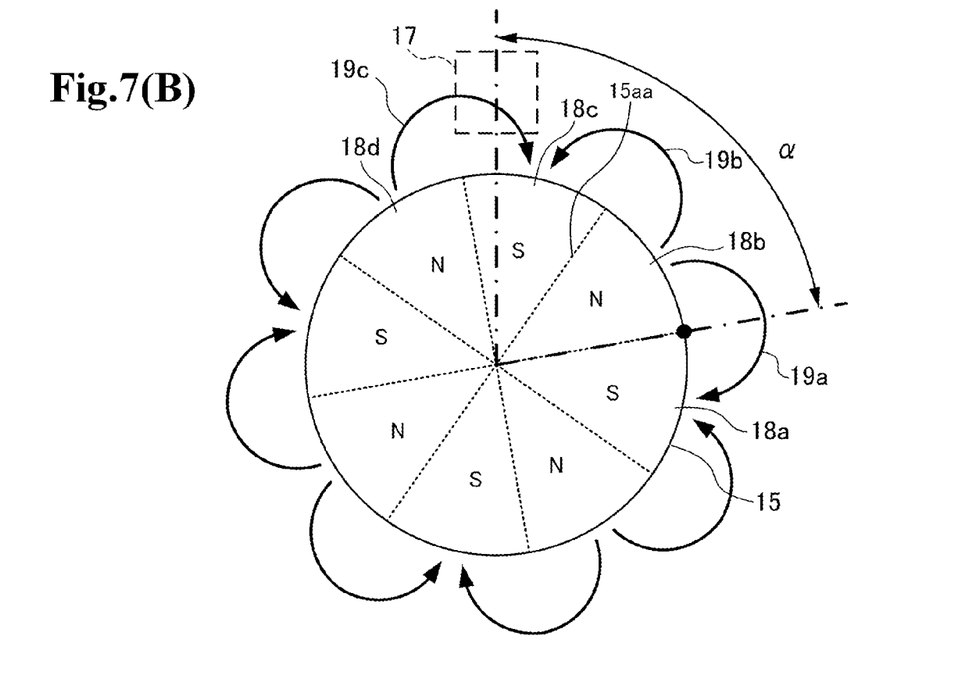
FIG. 7(B) is a view showing an example of the arrangement of the magnet and the magnetic sensor composing the accelerator position sensor disclosed in FIG. 1.

To be specific, as shown in FIG. 4, the one end face 15a of the inner rotor 15 is segmented into eight portions radially from the rotation axis toward the side face, and N-poles and S-poles are alternately formed on the end face 15a in order in the circumferential direction, that is, in the rotation direction. With this, on the one end face 15a of the inner rotor 15, an N-pole and an S-pole adjacent to each other form a pair of magnetic poles and, as shown by arrows 19a to 19c in FIG. 7, a magnetic flux heading from the N-pole to the S-pole is generated at each of pairs of magnetic poles, which will be described later.

On the other hand, as shown in FIG. 4, the side face 15c of the inner rotor 15 is segmented into sixteen portions along the rotation axis, and N-poles and S-poles are alternately formed on the side face 15c in order in the circumferential direction, that is, in the rotation direction about the rotation axis. With this, on the side face 15c of the inner rotor 15, an N-pole and an S-pole adjacent to each other form a pair of magnetic poles, and a magnetic flux heading from the N-pole to the S-pole is generated at each of pairs of magnetic poles.

Further, as shown in FIG. 4, the inner rotor 15 is configured in a manner that segmentation parts 15ca of the magnetic poles formed on the side face 15c are located so as to correspond to all segmentation parts 15aa of the magnetic poles formed on the one end face 15a at the boundary between the one end face 15a and the side face 15c. To be specific, in the example of FIG. 4, by forming two magnetic poles (an N-pole and an S-pole) on the side face 15c so as to correspond to one magnetic pole (an N-pole or an S-pole) formed on the one end face 15a, the segmentation parts 15ca for every two magnetic poles on the side face 15c are located so as to correspond to the segmentation parts 15aa of the magnetic poles on the one end face 15a, respectively. Thus, at the boundary between the one end face 15a and the side face of the inner rotor 15, it is possible, by forming combinations of different magnetic poles, to suppress magnetic disturbance.

Figure 5A:
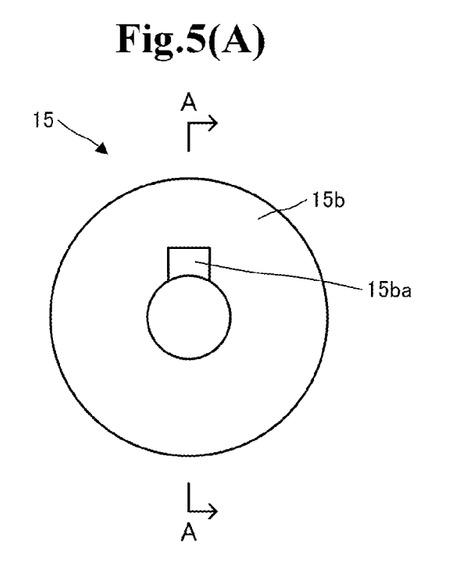
FIG. 5(A) is a view showing the configuration of the magnet composing the accelerator position sensor disclosed in FIG. 1.
Figure 5B:
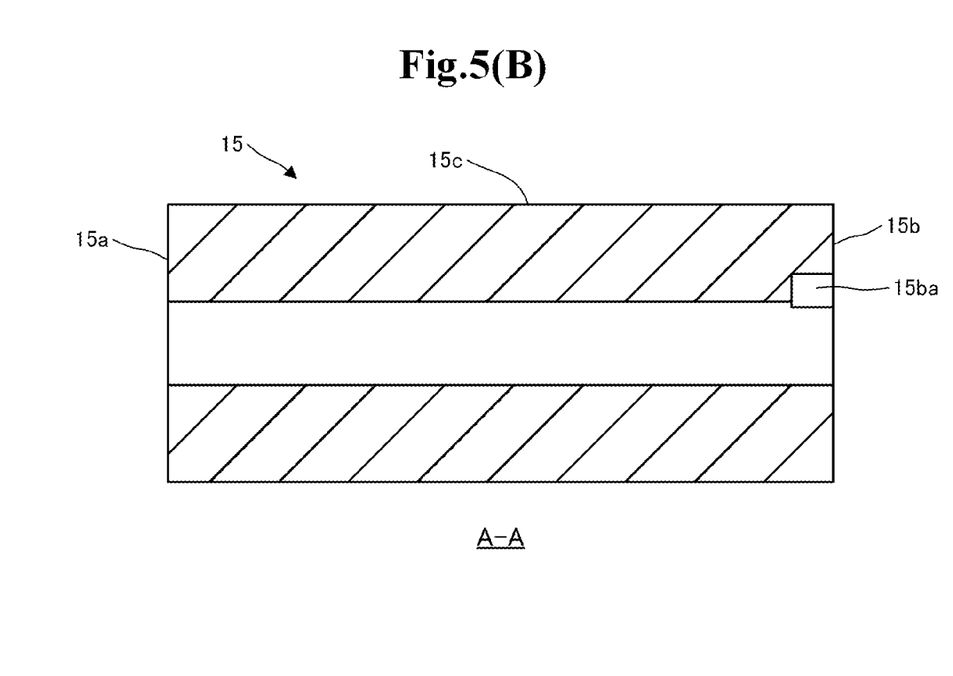
FIG. 5(B) is a view showing the configuration of the magnet composing the accelerator position sensor disclosed in FIG. 1.

FIG. 5(A) shows a view seen from the other end face 15b located on the opposite side from the one end face 15a which the magnetic sensor 17 faces of the inner rotor 15, and FIG. 5(B) shows a cross-section view of the inner rotor 15 taken along line A-A in FIG. 5(A) is shown. As shown in this view, a cutout 15ba is formed as a positioning portion (a positioning structure) on the other end face 15b of the inner rotor 15. As an example, the cutout 15ba is located near the outer periphery of the through hole formed in the center of the other end face 15b of the inner rotor 15, and is formed by a portion that is recessed toward the one end face 15a. The cutout 15ba is used for positioning when magnetizing the magnetic poles on the inner rotor 15, and is used for positioning when assembling the inner rotor 15 as the accelerator position sensor 14. For example, at the time of manufacturing the inner rotor 15, magnetic poles are magnetized on the side face 15c from the outer peripheral direction of the side face 15c at the same time as sintering with a mold, and then the inner rotor 15 is removed from the mold and positioned by using the cutout 15ba, and then, magnetic poles are magnetized on the one end face 15a from the direction of the end face 15a so that the segmentation parts 15aa and 15ca of the magnetic poles correspond to each other at the boundary between the one end face 15a and the side face 15c as described above. Thus, by magnetizing from directions that the magnetic sensor 17 and the outer case 16 face the inner rotor 15, respectively, it is possible to securely obtain magnetic fluxes of directions heading to the magnetic sensor 17 and the outer case 16, respectively.

However, the abovementioned positioning portion is not limited to be necessarily formed by the cutout 15ba, and may be any mark. For example, the positioning portion may be a groove or a scratch formed on the surface of the other end face 15b of the inner rotor 15, or may be a mark drawn with ink or the like. Moreover, the positioning portion is not limited to be necessarily formed on the other end face 15b of the inner rotor 15, and may be formed on the one end face 15a or the side face 15c of the inner rotor 15.

Figure 6:
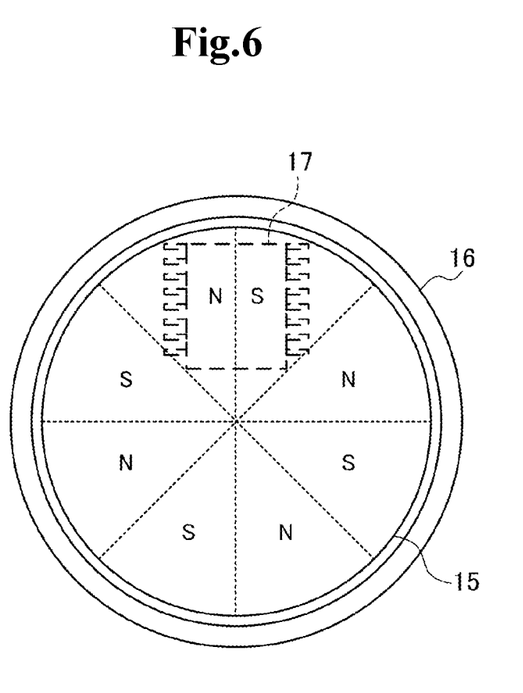
FIG. 6 is a view showing an example of the arrangement of the magnet and a magnetic sensor composing the accelerator position sensor disclosed in FIG. 1.

The case where the one end face 15a of the inner rotor 15 is segmented into eight portions to form magnetic poles has been illustrated above. In this case, an N-pole and an S-pole adjacent to each other which are a pair of magnetic poles located at one segmentation portion 15aa are located in a range of angle of 90 degrees from the center of the rotation axis. Therefore, the inner rotor 15 having the above configuration is favorable when a required detection angle α of the rotation angle of the throttle grip 12 is about 90 degrees. With reference to FIGS. 6 and 7, a case where the required detection angle α of the rotation angle of the throttle grip 12 is about 90 degrees, specifically, 80 degrees will be described as an example.

First, as shown in FIG. 6, in the accelerator position sensor 14, the magnetic sensor 17 is arranged so as to face the one end face 15a of the inner rotor 15 at a distance from the center to the outer circumferential side. With this, a decrease in accuracy of detection of a magnetic flux generated between adjacent magnetic poles by the magnetic sensor 17 can be suppressed. In FIG. 7, for convenience of explanation, magnetic fluxes generated by the magnetic poles and the magnetic sensor 17 are illustrated outside the outer circumference of the one end face 15a of the inner rotor 15. Moreover, in FIG. 7, the required detection angle α is set to 80 degrees and shown by a dashed-dotted line. In this case, as will be described below, by mainly detecting a magnetic flux generated at a pair of magnetic poles (an N-pole 18b and an S-pole 18c) located at one segmentation part 15aa, the magnetic sensor 17 can detect the rotation angle of the throttle grip 12 within the range of 80 degrees.

To be specific, first, as shown in FIG. 7(A), in an initial state, the magnetic sensor 17 faces the boundary between the two magnetic poles 18a and 18b, and the magnetic sensor 17 detects a magnetic flux generated at the magnetic pole 18b, that is, a magnetic flux 19a generated between the magnetic pole 18b (N-pole) and the magnetic pole 18a (S-pole). After that, in a case where the operator operates the throttle grip 12 to rotate the inner rotor 15 from the initial position shown in FIG. 7(A) up to the required detection angle α shown in FIG. 7(B) in the clockwise direction in the view, the magnetic sensor 17 can sequentially detect the magnetic flux 19a between the magnetic pole 18b (N-pole) and the magnetic pole 18a (S-pole), a magnetic flux 19b between the magnetic pole 18b (N-pole) and a magnetic pole 18c (S-pole), and a magnetic flux 19c between the magnetic pole 18c (S-pole) and a magnetic pole 18d (N-pole). Within this required detection angle α, the magnetic sensor 17 detects a magnetic flux generated by a pair of magnetic poles (N-pole and S-pole), and therefore, detects different magnetic flux directions at all times, that is, detects different electric signals at all times. As a result, it is possible to prevent misdetection of the rotation angle of the throttle grip 12.

Although the inner rotor 15 in this example embodiment has eight magnetic poles formed on the one end face 15a, the number thereof is not limited to eight and may be any number. That is to say, the one end face 15a of the inner rotor 15 may be segmented at any angle, and any number of magnetic poles may be formed. Moreover, the one end face 15a of the inner rotor 15 is radially and equally segmented and magnetic poles are formed in the above description, but may not be equally segmented necessarily. For example, on the one end face 15a of the inner rotor 15, the pair of magnetic poles (N-pole and S-pole) denoted by reference numerals 18b and 18c of FIG. 7 used for detection of the rotation angle of the throttle grip 12 as described above may be formed segmented by 45 degrees as illustrated in the view, and magnetic poles on the other part may be formed segmented by different angles.

Then, as shown in FIG. 4 described above, sixteen magnetic poles are formed on the side face 15c of the inner rotor 15, and the outer case 16 that is a magnetic member is arranged therearound. Thus, without being limited to the number of the magnetic poles formed on the one end face 15a, many magnetic poles are formed on the side face 15c of the inner rotor 15. Therefore, when the inner rotor rotates, a magnetic force that prevents the rotation of the inner rotor 15 is generated by the magnetized outer case 16, and a resistance force due to the magnetic force according to the number of the magnetic poles can be generated. As a result, it is possible to give a desired feeling of operation to an operator who operates the throttle grip 12, and it is possible to increase the degree of freedom in design with respect to an operation load.

Although the inner rotor 15 in this example embodiment has sixteen magnetic poles formed on the side face 15c, the number thereof is not limited to sixteen, and may be any number. That is to say, the side face 15c of the inner rotor 15 may be segmented into any width, and any number of magnetic poles may be formed. For example, the number of the magnetic poles on the side face 15c may be more than or less than the number of the magnetic poles on the one end face 15a. Moreover, in the above description, the side face 15c of the inner rotor 15 is segmented into equal widths to form the magnetic poles, but the side face 15c of the inner rotor 15 may not be segmented into equal widths necessarily. Moreover, in the above description, the inner rotor 15 is formed so that, at the boundary between the one end face 15a and the side face 15c, the segmentation parts 15ca of the magnetic poles formed on the side face 15c correspond to all the segmentation parts 15aa of the magnetic poles formed on the one end face 15a, but the segmentation parts 15aa and 15ca are not necessarily correspond to each other. For example, the segmentation part 15ca of the magnetic pole formed on the side face 15c may correspond to the segmentation part 15aa of only part including one of the magnetic poles formed on the one end face 15a, or none of the segmentation parts 15aa may correspond to the segmentation parts 15ca.

Further, the magnetic poles on the side face 15c of the inner rotor 15 are formed on the entire side face, but may be formed only on part of the side face 15c. Moreover, the magnetic poles on the side face 15c of the inner rotor 15 are for generating a feeling of operation of the throttle grip 12 as described above, but magnetic poles corresponding to such magnetic poles may be formed on the other end face 15b of the inner rotor 15. In this case, the inner rotor 15 may be configured so that the other end face 15b of the inner rotor 15 is radially segmented in the same manner as the one end face 15a to alternately form N-poles and S-poles in order in the rotation direction and a plate member made of a magnetic material to be a replacement of the outer case 16 is fixedly mounted on the handle bar 11 so as to be close to and face the other end face 15b. With this, when the inner rotor 15 rotates, a magnetic force that prevents the rotation of the inner rotor 15 is generated by the plate member magnetized by the magnetic poles formed on the other face 15b, and a resistance force due to the magnetic force according to the number of the magnetic poles can be generated. With this, the number of the magnetic poles formed on the other end face 15b may be set so that a feeling of operation given to an operator who operates the throttle grip 12 becomes a desired feeling of operation. That is to say, the number of the magnetic poles formed on the other end face 15b may be any number that is different from the number of the magnetic poles formed on the one end face 15a of the inner rotor 15 that a rotation angle is detected by the magnetic sensor 17.

As described above, the magnetic poles for generating a feeling of operation of the throttle grip 12 are not limited to be formed on the side face 15c or the other end face 15b of the inner rotor 15, and may be formed on the one end face 15a. In this case, a plate member made of a magnetic material to be a replacement of the outer case 16 is fixedly mounted on the handlebar 11 so as to face the one end face 15a. Moreover, in this case, the magnetic poles for detecting the rotation angle of the inner rotor 15 may be formed on the side face 15c or the other end face 15b of the inner rotor 15, and the magnetic sensor 17 is mounted so as to face such magnetic poles. Thus, the inner rotor 15 of this example embodiment may have different numbers of magnetic poles used for detecting the rotation angle of the throttle grip 12 and magnetic poles for generating a feeling of operation of the throttle grip 12 formed on different faces, respectively.

As described above, in this example embodiment, the magnetic poles for detecting the rotation angle of the throttle grip 12 are formed on the one end face 15a of the inner rotor 15, the magnetic poles for generating an operating load on the operator of the throttle grip 12 are formed on the side face 15c, and the numbers of the magnetic poles are different between the one end face 15a and the side face 15c. With this, by setting the number of the magnetic poles on the one end face 15a and the number of the magnetic poles on the side face 15c of the inner rotor 15, respectively, it is possible to individually change a required detection angle that enables detection of the rotation angle of the throttle grip 12 and an operating load on the driver. As a result, it is possible to increase the degree of freedom in design with respect to the detection angle and the operating load of the accelerator position sensor 14. In particular, by forming more magnetic poles on the side face 15c than on the one end face 15a of the inner rotor 15, it is possible to, while setting the required detection angle to a desired angle on the one end face 15a, generate a desired operating load that is larger than in the case of forming the same number of magnetic poles on the side face 15c as on the one end face 15a.

Further, while the numbers of the magnetic poles on the one end face 15a and on the side face 15c of the inner rotor 15 are different, some of the segmentation parts of the magnetic poles are matched at the boundary between the one end face 15a and the side face 15c. With this, magnetic disturbance can be suppressed at the boundary between the one end face 15a and the side face of the inner rotor 15. By matching the segmentation parts of the magnetic poles on the one end face 15a used by the magnetic sensor 17 to detect a magnetic flux with the segmentation parts of the magnetic poles on the side face 15c, it is possible to suppress a decrease in detection accuracy.

Further, since a positioning portion such as the cutout 15ba is formed on the other end face 15b of the inner rotor 15, the magnetic poles can be magnetized to the inner rotor 15 at more accurate positions, and the inner rotor15 can be assembled accurately.

<Supplementary Notes>

The whole or part of the example embodiments disclosed above can be described as the following supplementary notes. Below, the overview of an accelerator position sensor and a magnet according to the present invention will be described. However, the present invention is not limited to the following configurations.

(Supplementary Note 1)

An accelerator position sensor held inside a throttle grip of a vehicle rotationally operated by a driver, the accelerator position sensor comprising:

a magnet extended along a rotation axis of the throttle grip and configured to rotate in conjunction with the throttle grip;

a magnetic detection unit arranged so as to face a predetermined face of the magnet; and a magnetic body arranged so as to face another face that is different from the predetermined face of the magnet, wherein on the predetermined face and the other face of the magnet, respectively, mutually different numbers of magnetic poles are magnetized along a rotation direction of the magnet.

(Supplementary Note 2)

The accelerator position sensor according to Supplementary Note 1, wherein:

the predetermined face of the magnet is an end face formed at an end in a rotation axis direction of the magnet; and the other face of the magnet is a side face formed along the rotation direction around the rotation axis of the magnet.

(Supplementary Note 3)

The accelerator position sensor according to Supplementary Note 2, wherein:

the end face of the magnet is segmented in a direction from the rotation axis to the side face of the magnet, and a plurality of magnetic poles are magnetized thereon; and the side face of the magnet is segmented along the rotation axis of the magnet, and a different number of magnetic poles from a number of the magnetic poles formed on the end face are magnetized thereon.

(Supplementary Note 4)

The accelerator position sensor according to Supplementary Note 3, wherein the magnet is formed so that at a boundary between the end face and the side face, segmentation parts of the magnetic poles magnetized on the side face are located so as to correspond to at least one of segmentation parts of the magnetic poles magnetized on the end face.

(Supplementary Note 5)

The accelerator position sensor according to Supplementary Note 4, wherein the magnetic detection unit is arranged so as to detect a magnetic flux of a pair of the magnetic poles magnetized on the end face located so as to correspond to the segmentation parts of the magnetic poles magnetized on the side face.

(Supplementary Note 6)

The accelerator position sensor according to Supplementary Note 4, wherein the magnet is formed so that at the boundary between the end face and the side face, the segmentation parts of the magnetic poles magnetized on the side face or the end face are located so as to correspond to all the segmentation parts of the magnetic poles magnetized on the end face or the side face.

(Supplementary Note 7)

The accelerator position sensor according to Supplementary Note 6, wherein the magnet is formed so that at the boundary between the end face and the side face, the segmentation parts of the magnetic poles magnetized on the side face are located so as to correspond to all the segmentation parts of the magnetic poles magnetized on the end face.

(Supplementary Note 8)

The accelerator position sensor according to any of Supplementary Notes 1 to 7, wherein the magnet is formed so that the number of the magnetic poles magnetized on the other face is more than the number of the magnetic poles magnetized on the predetermined face.

(Supplementary Note 9)

The accelerator position sensor according to any of Supplementary Notes 1 to 7, wherein the magnet has a positioning structure.

(Supplementary Note 10)

The accelerator position sensor according to any of Supplementary Notes 1 to 7, wherein the magnet has a positioning structure on an end face formed at an end in a rotation axis direction of the magnet that is different from the predetermined face which the magnetic detection unit faces.

(Supplementary Note 11)

The accelerator position sensor according to Supplementary Note 10, wherein the positioning structure of the magnet is formed by a cutout formed on the end face.

(Supplementary Note 12)

A magnet installed in an accelerator position sensor held and installed inside a throttle grip of a vehicle, the accelerator position sensor comprising:

the magnet extended along a rotation axis of the throttle grip and configured to rotate in conjunction with the throttle grip;

a magnetic detection unit arranged so as to face a predetermined face of the magnet; and a magnetic body arranged so as to face another face that is different from the predetermined face of the magnet, wherein on the predetermined face and the other face of the magnet, respectively, mutually different numbers of magnetic poles are magnetized along a rotation direction of the magnet.

Although the present invention has been described above with reference to the example embodiments, the present invention is not limited to the above example embodiments. The configurations and details of the present invention can be changed in various manners that can be understood by one skilled in the art within the scope of the present invention.

DESCRIPTION OF REFERENCE NUMERALS 10 throttle device
11 handle bar
12 throttle grip
13 return spring
14 accelerator position sensor
15 inner rotor
15a one end face
15aa segmentation part
15b other end face
15ba cutout
15c side face
15ca segmentation part
16 outer case
17 magnetic sensor

The invention claimed is:

1. An accelerator position sensor held inside a throttle grip of a vehicle rotationally operated by a driver, the accelerator position sensor comprising:
   a magnet extended along a rotation axis of the throttle grip and configured to rotate in conjunction with the throttle grip;
   a magnetic sensor arranged so as to face a predetermined face of the magnet; and
   a magnetic body made of a soft magnetic material and arranged so as to face another face that is different from the predetermined face of the magnet,
   wherein on the predetermined face and the other face of the magnet, respectively, mutually different numbers of magnetic poles are magnetized along a rotation direction of the magnet.

2. The accelerator position sensor according to claim 1, wherein:
   the predetermined face of the magnet is an end face formed at an end in a rotation axis direction of the magnet; and
   the other face of the magnet is a side face formed along the rotation direction around the rotation axis of the magnet.

3. The accelerator position sensor according to claim 2, wherein:
   the end face of the magnet is segmented in a direction from the rotation axis to the side face of the magnet, and a plurality of magnetic poles are magnetized thereon; and
   the side face of the magnet is segmented along the rotation axis of the magnet, and a different number of magnetic poles from a number of the magnetic poles formed on the end face are magnetized thereon.

4. The accelerator position sensor according to claim 3, wherein the magnet is formed so that at a boundary between the end face and the side face, segmentation parts of the magnetic poles magnetized on the side face are located so as to correspond to at least one of segmentation parts of the magnetic poles magnetized on the end face.

5. The accelerator position sensor according to claim 4, wherein the magnetic sensor is arranged so as to detect a magnetic flux of a pair of the magnetic poles magnetized on the end face located so as to correspond to the segmentation parts of the magnetic poles magnetized on the side face.

6. The accelerator position sensor according to claim 4, wherein the magnet is formed so that at the boundary between the end face and the side face, the segmentation parts of the magnetic poles magnetized on the side face or the end face are located so as to correspond to all the segmentation parts of the magnetic poles magnetized on the end face or the side face.

7. The accelerator position sensor according to claim 6, wherein the magnet is formed so that at the boundary between the end face and the side face, the segmentation parts of the magnetic poles magnetized on the side face are located so as to correspond to all the segmentation parts of the magnetic poles magnetized on the end face.

8. The accelerator position sensor according to claim 1, wherein the magnet is formed so that the number of the magnetic poles magnetized on the other face is more than the number of the magnetic poles magnetized on the predetermined face.

9. The accelerator position sensor according to claim 1, wherein the magnet has a positioning structure.

10. The accelerator position sensor according to claim 1, wherein the magnet has a positioning structure on an end face formed at an end in a rotation axis direction of the magnet that is different from the predetermined face which the magnetic sensor faces.

11. The accelerator position sensor according to claim 10, wherein the positioning structure of the magnet is formed by a cutout formed on the end face.

12. A magnet installed in an accelerator position sensor held and installed inside a throttle grip of a vehicle, the accelerator position sensor comprising:
   the magnet extended along a rotation axis of the throttle grip and configured to rotate in conjunction with the throttle grip;
   a magnetic sensor arranged so as to face a predetermined face of the magnet; and
   a magnetic body made of a soft magnetic material and arranged so as to face another face that is different from the predetermined face of the magnet,
   wherein on the predetermined face and the other face of the magnet, respectively, mutually different numbers of magnetic poles are magnetized along a rotation direction of the magnet.

* * * * *